United States Patent
Barland, Sr. et al.

[15] 3,693,913
[45] Sept. 26, 1972

[54] FLUID FLOW CONTROL DEVICE

[72] Inventors: Edwin S. Barland, Sr.; Joseph J. Cornish, III; Grady B. Henrich, all of Marietta, Ga.

[73] Assignee: Lockheed Aircraft Corporation, Burbank, Calif.

[22] Filed: Aug. 24, 1970

[21] Appl. No.: 66,301

[52] U.S. Cl. ................................................ 244/130
[51] Int. Cl. .................................................. B64c 7/00
[58] Field of Search .......... 244/130, 40 R; 138/37, 39; 416/500, 181; 114/126

[56] References Cited

UNITED STATES PATENTS

| | | | |
|---|---|---|---|
| 2,353,856 | 7/1944 | Shannon | 244/130 |
| 2,927,749 | 3/1960 | Brownell | 244/130 |
| 3,224,401 | 10/1965 | Kobus | 114/126 |
| 2,967,030 | 1/1961 | Whitcomb | 244/130 |
| 3,508,561 | 4/1970 | Cornish | 138/39 |
| 2,658,455 | 11/1953 | Seinfeld | 416/181 |

*Primary Examiner*—Milton Buchler
*Assistant Examiner*—Gregory W. O'Connor
*Attorney*—John J. Sullivan and George C. Sullivan

[57] ABSTRACT

A fluid flow control device deals with undesirable aerodynamic characteristics associated with cylinder-plus-hemisphere shaped airborne radar housings when positioned in a generally lateral projecting location from an aircraft. The device consists of a rectangular plate mounted horizontally to the downstream side of the housing and extending radially from the fuselage and an end plate mounted perpendicular to the first plate. This end plate has an upstream edge that conforms to the cylindrical portion of the housing adjacent the outer end thereof and extends downstream a distance equal to about one and one-fourth times the diameter of the cylindrical housing. The width of this end plate is at least equal to the diameter of the cylindrical housing. Vortices that shed in the streamwise direction from the housing are entrained by the end plate/horizontal plate channel while the air flow over the hemispherical end of the housing is prevented from mixing with these shedded vortices resulting in substantially eliminating aircraft drag and buffeting. The plates contain perforations which serve to neutralize any destabilizing influences that may result due to the mounting of the device on the aircraft.

9 Claims, 5 Drawing Figures

PATENTED SEP 26 1972 3,693,913

INVENTORS
EDWIN SCOTT BARLAND, Sr.
JOSEPH J. CORNISH III
GRADY B. HENRICH

By George C. Sullivan, agent

John J. Sullivan
Attorney

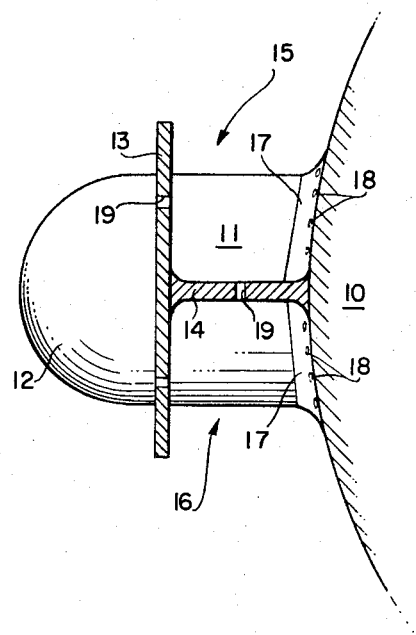
FIG_4
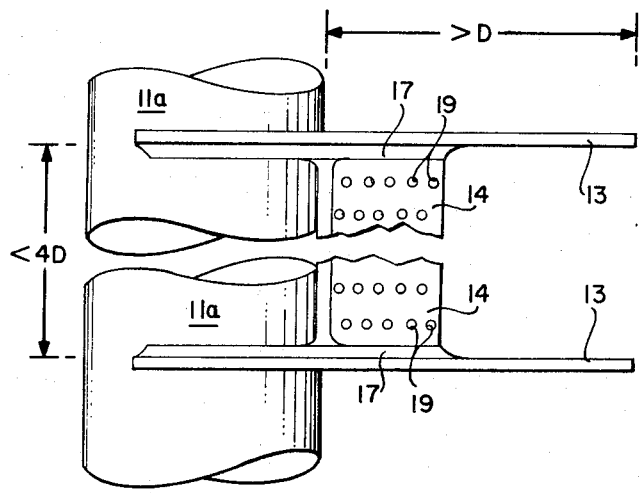
FIG_5

FLUID FLOW CONTROL DEVICE

This invention relates to fluid flow control devices and more particularly to such a device that is designed and adapted to minimize the interference with, and resistance to, fluid movement by an otherwise obstructing body.

It is often necessary to obstruct the pure streamline configuration of vehicles which allows them to move and operate most efficiently in their fluid medium in order to provide them with required mission capabilities. In such cases special provisions are made to minimize the required obstruction by providing fairings, and the like, which effectively cause a slow transition of the ambient fluid flow over the body. This serves to avoid an undue increase in drag and/or buffeting on the vehicle.

In some cases, as for example, where the obstruction to the streamline surface extends a considerable distance laterally, outwardly of the body, the fairing becomes substantial to a point where it imposes an additional penalty on the vehicle, notably in the form of weight. Also, depending upon the nature of the obstruction and its function, such a fairing may interfere with the vehicle's mission. In military aircraft, for example, gun turrets are employed which necessarily extend into the airstream and which are required to permit a 360° sight and firing field. In order to minimize the adverse affect of these projecting turrets on the flight of the aircraft, elaborate fairings have been proposed which are retractable and extendable with respect to the adjacent fuselage surface. This allows for minimizing drag and buffeting when the turret is not being used and to completely expose the turret for complete operation when needed.

Where possible, such obstructions on aircraft are themselves configured to a streamline shape to minimize drag and buffeting. This is not feasible, however, due to attitude changes of the aircraft during normal operation and the consequent aerodynamic effect of the streamline body on the aircraft. In these situations, the ideal cross section or profile of the obstruction body is bluff shape, preferably circular, whereby it is omnidirectional with respect to air flow. Thus, an election must be made predicated on the lesser of two evils, to wit aerodynamic distortion affecting flight control and maneuvering of the aircraft or drag, buffeting, and chattering, which can produce structural failures.

In the particular case at hand, to which the present invention has been specifically applied, the obstructing body is an airborne radar or sensor antenna (radome). This antenna is a standard design having a packaged configuration that comprises a cylinder terminating at its outer end in a hemisphere. The reason for this shape is that it ideally encloses the contained equipment and is usually mounted at so as to extend in a forward direction from the nose of the fuselage or similar nacelle of the aircraft. In this location, the projection is virtually unobstrusive.

There are other installations, however, as dictated by the particular missions of the aircraft. These include a projection laterally of the fuselage, nacelle, etc., where the antenna constitutes an intolerable obstruction, in terms of drag and turbulence, to normal airflow over and around the aircraft. The extension of such antenna from the aircraft is such that conventional fairing thereof would result in a totally different aerodynamic design of the aircraft and a substantial increase in its weight. Also, the size of a proper fairing would be such as to interfere with other components of the aircraft, including doors and other openings and special provisions would be necessary.

Also, configuring the circular or cylindrical portion of the antenna to streamline is no adequate solution, because of the interference with normal flight maneuvers involving attitude variations of the aircraft. To compensate for this, as for example by movable control surfaces or the like, would only complicate the matter and result in increased costs and weight with a decrease in performance and reliability.

The present invention was applied to the airborne radar or sensor antenna problem in order to overcome the above and other objections incidental thereto. Essentially, it is intended to substantially reduce or eliminate the aerodynamic drag penalty and airframe buffet resulting from installation of the circumferentially oriented radar or sensor antenna on the aircraft fuselage or other component with minimum addition to and/or modification of the aircraft.

To this end, it was decided to direct and control the airflow over and around the antenna and adjacent aircraft component in such a way as to prevent the enlargement and commingling of vortices produced in the airflow by the obstruction. This was effectively accomplished by establishing discrete channels immediately aft of the antenna to contain the initial vortex and exclude additional airflow to its core, whereby such additional airflow is made to pass along the channels and aft into the wake of the aircraft.

More specifically, an airflow control device is fixedly secured to and extends aftwardly from the antenna which comprises a generally flat deflector plate disposed substantially parallel to and in spaced relation with the adjacent surface of the aircraft component. A splitter plate is connected to the aft side and adjacent the center of the antenna relative to the direction of level flight or cruise of the aircraft so as to be disposed perpendicular to the deflector plate. An upper and lower channel is thereby established on the aft side of the antenna to contain and control airflow passing over and around the antenna during normal operation of the aircraft.

With the above and other objects in view, as will be apparent, this invention consists in the construction, combination, and arrangement of parts, all as hereinafter more clearly described, claimed, and illustrated in the accompanying drawings, wherein:

FIG. 1 is an isometric view of a fragmentary portion of an aircraft nacelle or other component in combination with an attached radar antenna to which a flow control device as contemplated herein has been attached at the downstream side thereof to show generally the relative position and location of the device with respect to the antenna and component, as well as the structural assembly of parts that comprises the device;

FIG. 4 is a section taken along the line 4—4 of FIG. 3; and

FIG. 5 is a view similar to FIG. 2 showing a slightly modified form of flow control device using multiple end plates associated with a cylinder, only fragments of which are shown.

Figure 1:
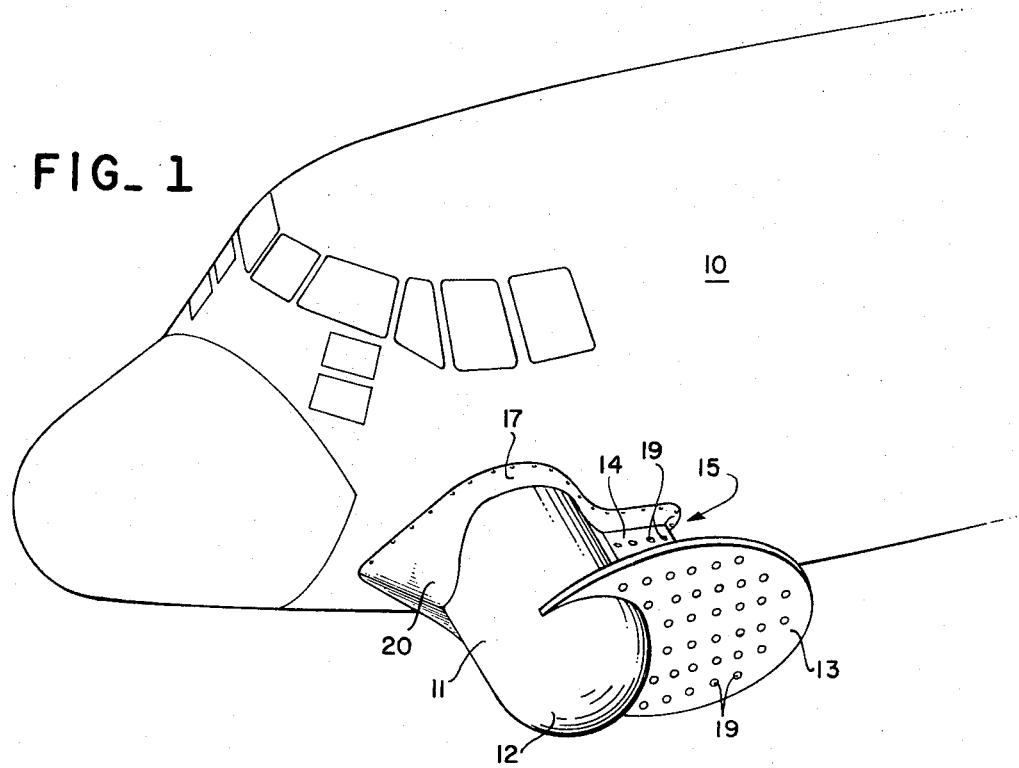

Referring more specifically to the drawings, 10 indicates an aircraft nacelle, fuselage or the equivalent component to which a standard radar antenna is connected and enclosed in a generally cylindrical cover or housing 11 that terminates outwardly in a hemisphere 12. This antenna housing 11 is disposed substantially perpendicular to the associated aircraft surface being laterally disposed and projecting into the airstream. A deflector or end plate 13 is fixedly secured to the peripheral surface of the housing 11 at substantially the end of the cylindrical portion 11 thereof, i.e., immediately adjacent the hemisphere 12. In order to be effective this end plate 13 can be located not more than approximately four antenna diameters, <4D, from the adjacent component and in the illustration is generally about one diameter, D, therefrom, which is approximately the minimum distance for all practical purposes. The length of the deflector plate 13 is critical to the extent that it cannot extend less than about one diameter, >D, from the rearmost surface of the radome housing 11 and preferably is about one and one-fourth diameters, 1 ¼D, inasmuch as additional length ceases to make any real contribution to the performance and actually only serves to add weight. The width of the end plate 13 cannot be less than approximately one diameter, D, and preferably is about one and one-half diameters, 1 ½ D, extending an arcuate fashion generally tangential to the associated surface of the radome housing 11. The forward edge of the plate 13 is concave, i.e., curved, so as to conform to and substantially abut the peripheral surface of the housing 11, with which it is immovably associated in any conventional and well-known manner and preferably in the manner to be described.

A splitter plate 14 is disposed perpendicular to the end deflector plate 13 and also to the surface of the component 10 being located adjacent the center of the housing 11 with respect to the longitudinal centerline on the horizontal of the aircraft component 10. Thus located, it equally divides the deflector plate 13 into upper and lower halves during level flight of the aircraft and coacts therewith and with the adjacent surface of the aircraft component 10 to form discrete upper and lower channels 15 and 16 immediately aft of the antenna housing 11. The adjacent surfaces of the splitter plate 14, aircraft component 10, housing 11, and the end plate 13 are all fair into a relatively smooth transition by means of and through the use of conventional fillets 17. Preferably, these fillets 17 are secured to the adjacent plates 13 and 14, component 10 and antenna housing 11. It is through these fillets 17 that the fluid flow control device may be immovably secured through rivets 18 or the like to both the aircraft component 10 and the radome housing 11.

For all intents and purposes, the effective dimension of the splitter plate 14 is such that it extends aft of the housing 11 not less than approximately one-fourth of the housing diameter, one-fourth D, and preferably is on the order of about one-half diameter, one-half D. Where necessary and if desired for structural integrity, suitable connecting means can be provided between the aft extremity of the deflector plate 13 and the aircraft component 10 without serious effect to the operation of the flow control device. As illustrated, however, this is not used and the structural integrity is provided by the appropriate selection of thickness and material used in the fabrication of the splitter plate 14.

The deflector plate 13, as well as the splitter plate 14 especially where it is of a substantial aft extending dimension, are each perforated by a suitable number of holes 19 which serve to allow air striking these surfaces to pass therethrough so that there is a balance of air pressures and forces on both sides of the plates 13 and 14. This minimizes the effect of attitude changes of the aircraft 10 during normal flight and maneuvers so as not to unduly affect the trim and flight operation thereof. Also, the fillet 17 located between the aircraft component 10 and splitter plate 14 is extended both over and under the radome housing 11 and terminates forward thereof in a fairing element 20 so as to present an aerodynamically clean leading edge of the radome housing to direct airflow thereover for entry into the channels 15 and 16 defined by the deflector and splitter plates 13 and 14 as above described.

With reference to FIG. 5 of the drawings, there is shown a cylindrical body 11a of indeterminate length to which the present invention has been applied. In this case multiple deflector plates 13 are employed in parallel, spaced relation at a distance not more than about four diameters, <4D, of the cylindrical body 11a. Each such plate 13 is of a length and width not less than about one cylinder diameter, >D.

Figure 2:
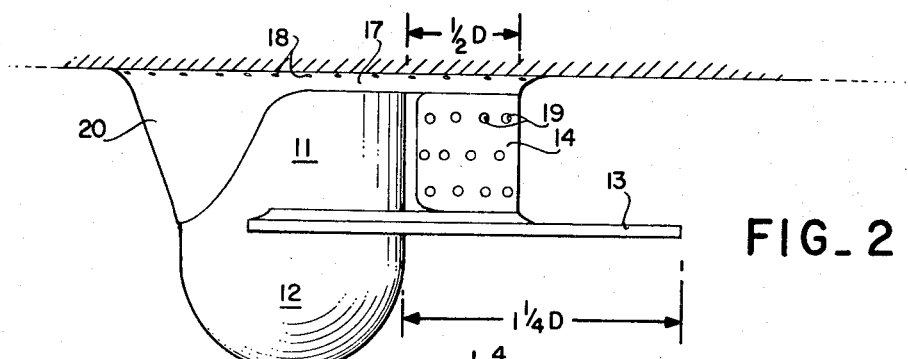
FIG. 2 is a plan view of the antenna with the control device attached thereto as it is related to the associated aircraft component which is indicated simply by its contour line, to show the relative dimensions thereof in the optimum form of the device.
Figure 3:
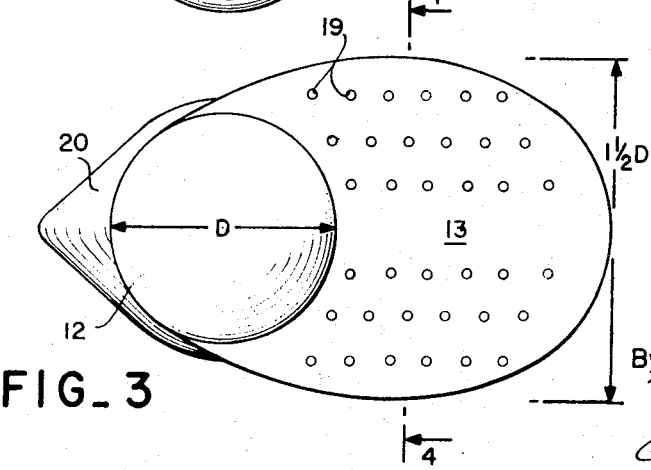
FIG. 3 is a side elevation thereof, i.e., a view from the bottom of FIG. 2.

A splitter plate 14 is mounted between each pair of adjacent deflector plates 13 in the same manner as previously described with respect to the arrangement shown in FIGS. 1 through 4 so as to extend aft from the body 11a a distance not less than about one-quarter of the diameter, one-fourth D, of said body. Fillets 17 are also employed between adjacent surfaces of the deflector and splitter plates 13 and 14 and body 11a as before. Where required each or any of the plates 13 and 14 may be perforated with holes 19.

While the invention has hereinabove been illustrated and described specifically to the airborne radar or sensor antenna application, it is equally applicable to other airflow obstructing bodies with minor modifications and variations as indicated by FIG. 5. None of these variations are deemed to constitute a departure from the inventive concept as embraced by the appended claims.

What is claimed is:

1. A fluid flow control device for a cylindrical body exposed to a fluid flow and extending substantially perpendicular from an associated surface to which it is secured comprising:

a deflector plate disposed generally parallel to and in spaced relation with said surface and in abutment with and extending in a downstream direction from said body with respect to said fluid flow; and a splitter plate disposed substantially perpendicular to said deflector plate and said surface and adjacent the surface of said cylindrical body substantially midway of the width of said deflector plate, said splitter plate extending in a downstream direction, and said deflector plate and said splitter plate being each perforated by a plurality of holes.

2. The device of claim 1 wherein said deflector plate is located at a distance not greater than approximately four diameters of said cylindrical body and extends therefrom a distance not less than about one diameter of said body, and said splitter plate extends a distance not less than about one fourth of a diameter of said body.

3. The device of claim 1 wherein the length of said cylindrical body is in excess of four diameters thereof and at least one additional deflector plate is associated therewith each such additional deflector plate being located at a distance not more than four diameters of said cylindrical body with respect to the next adjacent deflector plate, and a splitter plate, as aforesaid, being disposed between each pair of adjacent deflector plates.

4. The device of claim 1 wherein said cylindrical body has a length substantially equal to one diameter thereof and where said deflector plate is located adjacent the outer end of said cylindrical body.

5. The device of claim 1 wherein said deflector plate extends a distance on the order of about one and a quarter diameters of said body.

6. The control device of claim 1 wherein the width of said deflector plate is about one and one half diameters of said body and is defined adjacent said body by longitudinal edges that are substantially tangential to said body surface.

7. The device of claim 1 wherein said splitter plate extends in a downstream direction a distance about one half a diameter of said body.

8. The device of claim 1 wherein the adjacent edge portions of said body, said deflector plate, said splitter plate, and said surface are faired by fillets to produce smooth surfaces to said fluid flow.

9. The device of claim 2 wherein said cylindrical body is mounted externally on an aircraft component to extend radially therefrom with said associated surface being the skin of said component whereby laminar airflow channels are established around said body defined by said component surface, said body and adjacent surfaces of said deflector and splitter plates.

* * * * *